United States Patent [19]
Saito

[11] Patent Number: 5,184,794
[45] Date of Patent: Feb. 9, 1993

[54] ROD HOLDER

[75] Inventor: Kazuo Saito, Yokohama, Japan

[73] Assignee: Nifco, Inc., Yokohama, Japan

[21] Appl. No.: 834,088

[22] Filed: Feb. 12, 1992

[30] Foreign Application Priority Data

Feb. 14, 1991 [JP]  Japan .................. 3-12602

[51] Int. Cl.[5] .......................................... F16M 13/00
[52] U.S. Cl. ................................ 248/68.1; 248/74.1; 248/316.5
[58] Field of Search ........... 248/68.1, 65, 74.4, 248/74.1, 231.5, 316.5, 230, 316.1; 16/317, 319, 337, 342, 341, 321, 82; 24/498

[56] References Cited

U.S. PATENT DOCUMENTS

| | | | |
|---|---|---|---|
| 2,353,671 | 7/1944 | Karish | 16/341 |
| 2,803,850 | 8/1957 | Hooper | 16/341 |
| 2,849,777 | 9/1958 | Ridgers et al. | 248/74.1 X |
| 3,608,130 | 9/1971 | Rudnick | 16/341 X |
| 3,792,829 | 2/1974 | Fickett | 248/229 X |
| 3,972,090 | 8/1976 | Holmes | 16/321 |
| 4,364,420 | 12/1982 | Kramer | 16/319 X |
| 4,437,633 | 3/1984 | André | 248/68.1 |
| 4,478,381 | 10/1984 | Pittion et al. | 248/74.1 X |
| 4,881,705 | 11/1989 | Kraus | 248/68.1 X |
| 4,914,781 | 4/1990 | Sokn et al. | 16/319 X |
| 4,993,772 | 2/1991 | Charen | 16/341 X |

FOREIGN PATENT DOCUMENTS 0292591  12/1990  Japan .................. 248/74.1

*Primary Examiner*—Karen J. Chotkowski
*Attorney, Agent, or Firm*—Schwartz & Weinrieb

[57] ABSTRACT

A rod holder includes a pair of clamp members. The clamp members are rotatably hinged at their respective one ends and are lockable as engaged with each other at their respective opposite ends for clamping and retaining a rod member in the rod holder. One of the clamp members is provided at its hinged portion with a stopper for preventing rotation of one of the clamp members beyond a prescribed angle relative to the other clamp member but permitting further rotation of the one clamp member toward the other clamp member upon application of an external force larger than the rotation-preventing force.

13 Claims, 3 Drawing Sheets

ROD HOLDER

BACKGROUND OF THE INVENTION

1. Field of the Invention

The present invention relates to a rod holder for mounting and holding rods, pipes, cables, accelerator wire, etc. used in the hydraulic system, fuel system, etc. of an automobile on an automobile body panel at prescribed positions.

2. Description of Prior Art

A prior art rod holder of this type will be described with reference to FIGS. 4 and 5.

The prior art rod holder 11 is molded from a resin material and comprises a first clamp member 12 mounted on an automobile body panel 10 (FIG. 5) and a second clamp member 112 rotatably connected to the first clamp member 12. The first clamp member 12 has its one end portion 12b provided integrally with an auxiliary holding portion 13 and its bottom provided integrally with a snap-engagement portion 16. The auxiliary holding portion 13 is formed with six flexible engaging wings 15 for permitting insertion of a hydraulic system pipe for a clutch or a fuel system pipe 14 and engaging it therewith and has its one side provided integrally with an engaging portion 20. The snap-engagement portion 16 comprises a leg portion 17 projecting downward from the lower surface of the first clamp member 12 and a pair of resilient engaging pieces 19 projecting upward from the lower end of the leg portion 17 toward the lower surface of the first clamp member 12 and extending aslant such that the distance between the free ends thereof is longer than the diameter of a fitting hole 18 (FIG. 5) bored in the automobile body panel 10. The opposite end portion 12a of the first clamp member 12 is substantially normally bent upward and provided on its top with a shaft 22 and in its opposite sides with notches 21 immediately below the shaft 22. The portions of the end portion 12a of the first clamp 12 defining the notches 21 each have a lower surface 21a inclined inwardly.

The second clamp member 112 has its one end 112a provided integrally with a pair of substantially C-shaped clips 23 which are snap-engaged with the shaft 22 of the first clamp member 12 and rotatably supported on the shaft 22 and its opposite end 112b provided integrally with an engaging claw 24 which is lockable as engaged with the engaging portion 20 of the auxiliary holding portion 13. The facing surfaces of the first and second clamp members 12 and 112 have rubber blocks 25 attached thereto with an adhesive agent.

The assemblage of the rod holder 11 is completed by attaching rubber blocks 25 to the surfaces of the first and second clamp members 12 and 112 and fitting the clips 23 of the second clamp member 112 onto the shaft 22 of the first clamp member 12 so that the second clamp member 112 is rotatable relative to the first clamp member 12.

Hydraulic control pipes 26 such as brake pipes are placed on the first clamp member 12 and then the second clamp member 112 is rotated about the shaft 22 of the first clamp member 12 toward the first clamp member 12 to clamp the pipes between the rubber blocks 25 of the first and second clamp members 12 and 112. The engaging claw 24 of the second clamp member 112 is then engaged with the engaging portion 20 of the auxiliary holding portion 13 to hold the pipes 26 clamped between the first and second clamp members 12 and 112. In this state, the snap-engagement portion 16 is inserted and engaged in the fitting hole 18 of the automobile body panel 10 to mount the pipes 26 on the body panel 10 via the rod holder 11. Another hydraulic control system pipe 14 is then mounted on the auxiliary holding portion 13 of the first clamp member 12. Depending on the circumstances, however, the pipe 14 may be mounted before the pipes 26 are mounted.

In the prior art rod holder 11, since the engaging claw 24 is locked as engaged with the engaging portion 20 by rotating and pushing the second clamp member 112 toward the first clamp member 12, there is a possibility of the rod holder 11 assuming such a locked state during its distribution etc. as a loose component, making it necessary for the locked state to be released before use. This lowers the operability of the rod holder 11. Therefore, it is necessary to handle the rod holder 11 so as to prevent it from locking during handling and transport.

OBJECT OF THE INVENTION

In view of the drawbacks described above, the present invention has been accomplished and the main object thereof is to provide a rod holder easy to handle and improved in operability.

SUMMARY OF THE INVENTION

To attain the object, according to the present invention there is provided a rod holder comprising a pair of clamp members rotatably hinged at their respective one ends and lockable as engaged with each other at their respective opposite ends for clamping and retaining a rod member therebetween and a stopper provided on one of the pair of clamp members at the hinged portion for preventing rotation of one of the pair of clamp members beyond a prescribed angle relative to the other clamp member but permitting further rotation of the one clamp member toward the other clamp member upon application of an external force larger than the rotation-preventing force.

In the rod holder of the present invention having the construction as described above, after one of the pair of clamp members have rotated a prescribed angle toward the other clamp member, it cannot further rotate until an external force larger than the rotation-preventing force is applied and, therefore, it is possible to prevent the pair of clamp members from being accidentally locked in engagement with each other.

BRIEF DESCRIPTION OF THE DRAWINGS

The and other objects, characteristic features and advantages of the present invention will become more apparent to those skilled in the art as the disclosure of the present invention is made hereinbelow with reference to the accompanying drawings in which like reference characters designate like or corresponding parts throughout the several views, and wherein.

DETAILED DESCRIPTION OF THE PREFERRED EMBODIMENT

The present invention will now be described in detail with reference to the illustrated embodiment.

Figure 1:
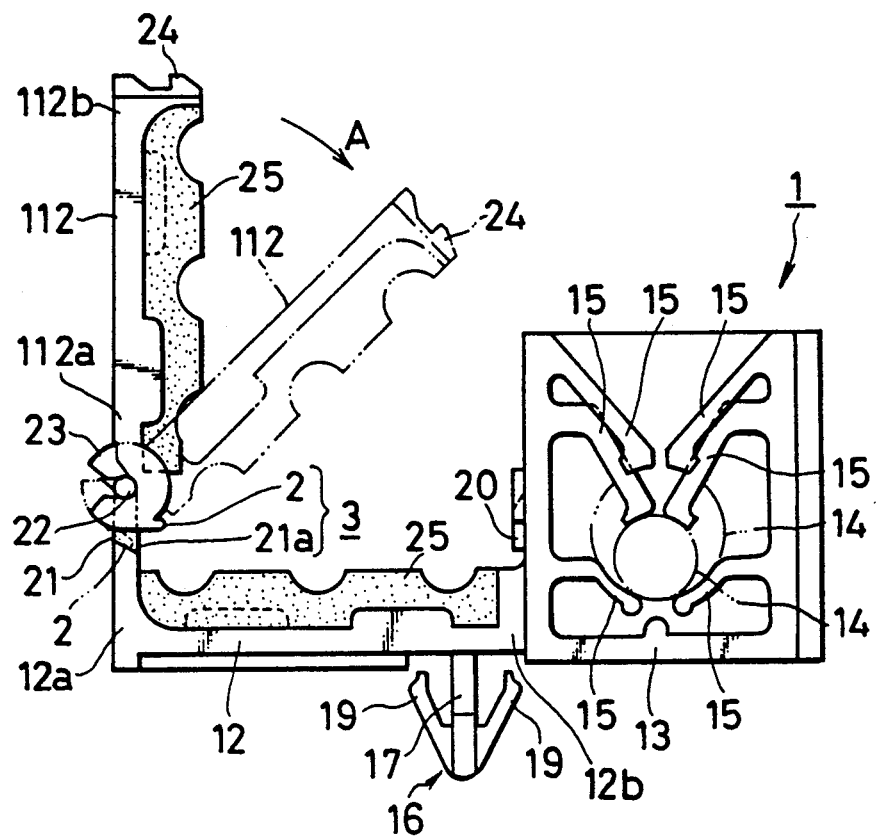
FIG. 1 is a side view illustrating one embodiment of the rod holder according to the present invention in a state prior to use.
Figure 2:
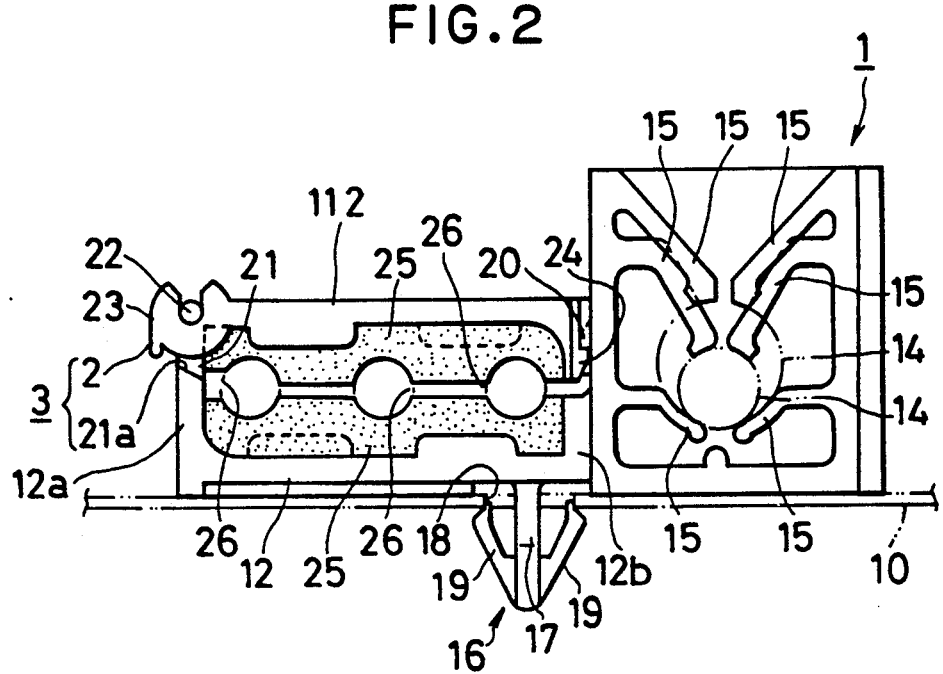
FIG. 2 is a side view of the rod holder in a state of use.
Figure 3:
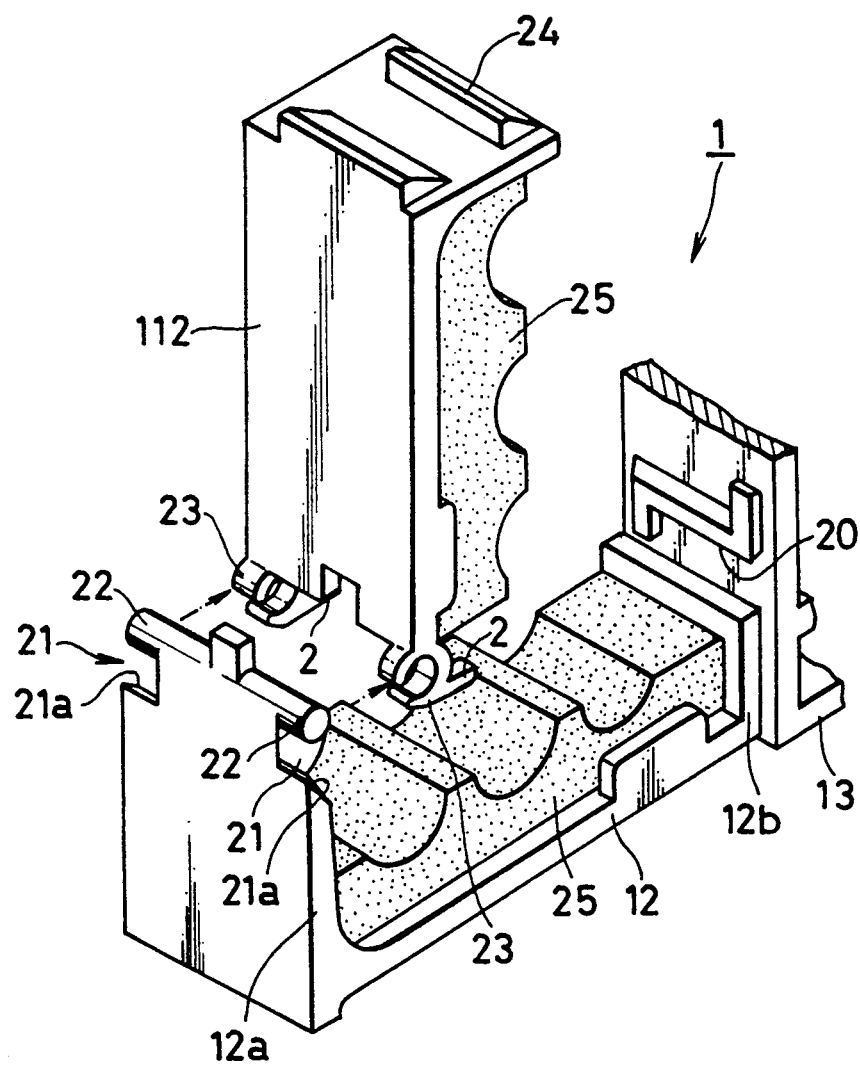
FIG. 3 is an exploded perspective view illustrating the principal part of the rod holder.
Figure 4:
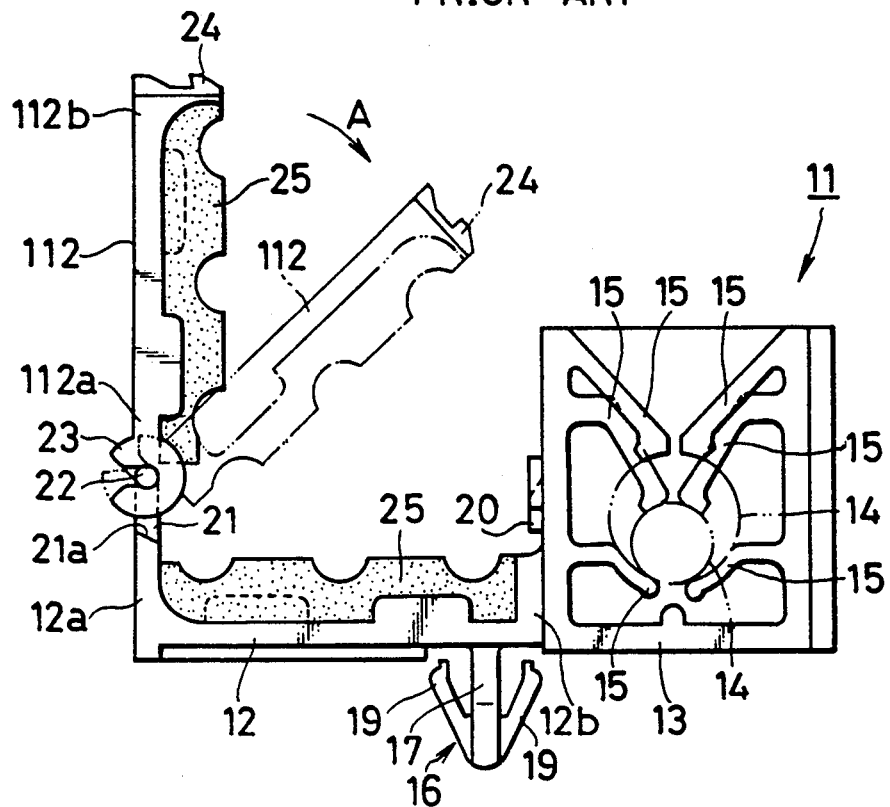
FIG. 4 is a side view illustrating a PRIOR ART rod holder in a state to use.
Figure 5:
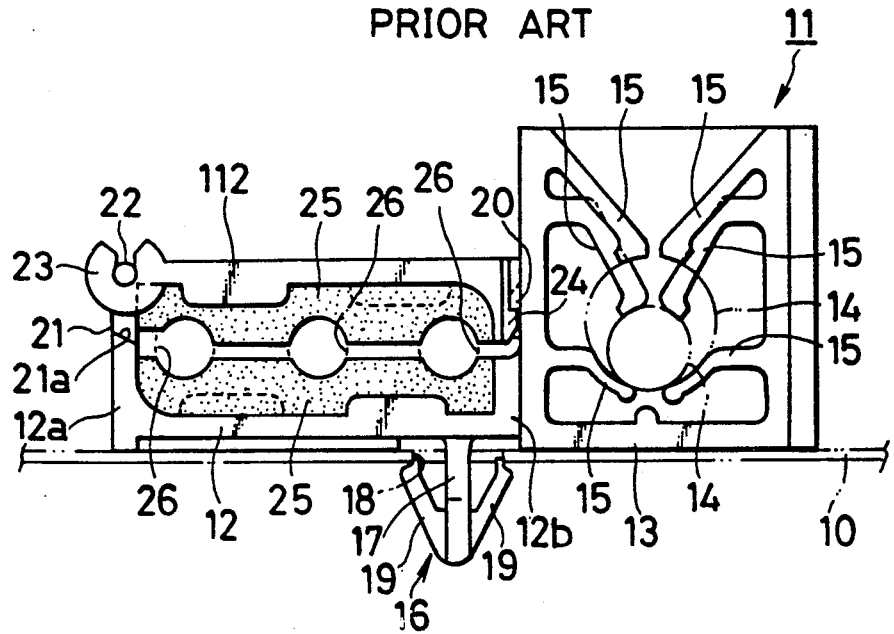
FIG. 5 is a side view illustrating the PRIOR ART rod holder in a state of use.

FIG. 1 to FIG. 3 illustrate one embodiment of the rod holder 1 according to the present invention, in which the same elements as those in FIGS. 4 and 5 are denoted by the same reference numerals and the details of such elements will be omitted from the description.

Similarly to the prior art rod holder 11, the rod holder 1 of the present invention comprises a pair of first and second clamp members 12 and 112 having rubber blocks 25, but differs from the prior art rod holder 11 in that substantially C-shaped clips 23 of the second clamp member 112 of the rod holder according to the present invention to be rotatably engaged with a shaft 22 of the first clamp member 12 are provided one each on the outer periphery thereof integrally with a resilient projection 2 extending outward.

The resilient projections 2 of the second clamp member 112 constitute stoppers 3 in conjunction with inwardly inclined surfaces 21a of notches 21 in the first clamp member 12 and have a length capable of abutting on the inclined surface 21a when the second clamp member 112 has rotated by a prescribed angle about the shaft 22 of the first clamp member 12 toward the first clamp member 12. When the first and second clamp members 12 and 112 have been assembled by fitting the shaft 22 in the clips 23 as illustrated in FIG. 3, the resilient projections 2 project inward over the inclined surfaces 21a as illustrated in FIG. 1. When the second clamp member 112 is rotated in the direction of arrow A in FIG. 1 around the shaft 22 to the point where the resilient projections 2 abut against the inclined surfaces 21a as shown by the phantom line in FIG. 1, it is prevented from further rotation. Thus, the aforementioned prescribed angle of rotation of the second clamp member 112 is defined by the abutment of the projections 2 against the inclined surfaces 21a. Unless an external force or load large enough to flex or deform the resilient projections 2 is applied to the second clamp member 112, further rotation of the second clamp member 112 is prevented, thereby making it possible to avoid accidental engagement between an engaging claw 24 of the second clamp member 112 and an engaging portion 20 of the auxiliary holding portion 13 during the transportation of the rod holder 1.

In use of the rod holder 1, hydraulic system pipes 26 are placed on the rubber block 25 of the first clamp member 12, then the second clamp member 112 is rotated toward the first clamp member 12 until the resilient projections 2 abut against the inclined surfaces 21a, and subsequently the second clamp member 112 is pushed toward the first clamp member 12 by a force large enough to flex or deform the resilient projections 2. As a result, the resilient projections 2 are flexed or deformed to clear the inclined surfaces 21a, thereby permitting the second clamp member 112 to further rotate smoothly and the engaging claw 24 to engage with the engaging portion 20. In this state, the pipes 26 are held clamped between the rubber blocks 25 of the first and second clamp members 12 and 112 as shown in FIG. 2. Thereafter, a snap-engagement portion 16 is snap-engaged in a fitting hole 18 bored in an automobile body panel 10 to mount the rod holder 1 on the body panel 10 and another hydraulic system pipe 14 is inserted into an auxiliary holding portion 13 with flexible engaging wings 15.

The present invention is not limited to the illustrated embodiment, but may be applied to any other device comprising two members rotatably hinged at their respective one ends and lockable as engaged with each other at their respective opposite ends. In the illustrated embodiment, the resilient projections are provided on the second clamp member side and the inclined surfaces are formed on the first clamp member side. However, this arrangement is not limitative, but may be reversed.

As has been described in the foregoing, according to the present invention it is possible to prevent the clamp members from being accidentally engaged with each other before the rod holder is used. Therefore, an operation of releasing the accidental engagement between the clamp members which has heretofore been required sometimes can be eliminated. Thus, the rod holder of the present invention is easy to handle and enjoys high operability.

Obviously, many modifications and variations of the present invention are possible in light of the above teachings. It is therefore to be understood that within the scope of the appended claims, the present invention may be practiced otherwise than as specifically described herein.

What is claimed is:

1. A rod holder, comprising:

a pair of clamping members rotatably hinged at respective first end portions thereof, and lockably engageable with each other at respective second end portions thereof for clamping and retaining a rod member therebetween;

a first one of said pair of clamping members having hinge shaft means provided upon said first end portion thereof for rotatably supporting a hinge mechanism of a second one of said pair of clamping members, and said hinge mechanism of said second one of said pair of clamping members comprising substantially cylindrical hinge means provided upon said first end portion thereof for substantially enveloping said hinge shaft means of said first one of said pair of clamping members so as to be rotatably supported upon said hinge shaft means of said first one of said pair of clamping members in order to hingedly mount said second one of said pair of clamping members upon said first one of said pair of clamping members; and stopper means comprising projection means extending tangentially outwardly from a peripheral portion of said substantially cylindrical hinge means of said second one of said pair of clamping members for engaging a portion of said first end portion of said first one of said pair of clamping members and thereby preventing rotation of said second one of said pair of clamping members beyond a predetermined angle relative to said first one of said pair of clamping members under the influence of a first predetermined force which tends to move said second one of said pair of clamping members from a first, open, non-clamping position toward a second, closed, clamping position with respect to said first one of said pair of clamping members, said projecting means being deformable, under the influence of a second predetermined force which tends to move said second one of said pair of clamping members from a position defined by means of said predetermined angle with respect to said first one of said pair of clamping members toward said second, closed, clamping position and wherein said second predetermined force is greater than said first predetermined force, for permitting further rotation of said second one of said clamping members from said position defined by means of said predetermined angle with respect to said first one of said pair of clamping members toward said second, closed clamping position with respect to said first one of said pair of clamping members so as to lockably engage said first one of said pair of clamping members in order to clamp and retain a rod member therebetween.

2. A rod holder as set forth in claim 1, wherein:
said first end portion of said first one of said pair of clamping members comprises an upstanding wall portion; and
said hinge shaft means of said first one of said pair of clamping members comprises a pair of oppositely extending hinge shafts integrally provided upon an upper end portion of said upstanding wall portion of said first one of said pair of clamping members.

3. A rod holder as set forth in claim 2, wherein:
said cylindrical hinge means of said second one of said pair of clamping members comprises a pair of axially spaced, co-axial hinge housing for respectively rotatably enveloping said pair of oppositely extending hinge shafts of said first one of said pair of clamping members, each one of said pair of axially spaced, coaxial hinge housings being provided with said stopper means.

4. A rod holder as set forth in claim 3, wherein:
said pair of axially spaced, coaxial hinge housing comprise substantially C-shaped clip members which are snappingly engageable with said pair of oppositely extending hinge shafts of said first one of said pair of clampling members.

5. A rod holder as set forth in claim 2, wherein:
said portion of said end portion of said first one of said pair of clamping members which is engaged by said stopper means when said second one of said pair of clamping members is disposed at said predetermined angle with respect to said first one of said pair of clamping members comprises a portion of said upstanding wall portion which is disposed within the vicinity of said hinge shaft means of said first one of said pair of clamping members.

6. A rod holder as set forth in claim 1, wherein:
said rod holder comprising said first and second clamping members is fabricated from a resin material.

7. A rod holder as set forth in claim 1, further comprising:
snap-engagement means formed upon said first one of said pair of clamping members for securing said rod holder within a support panel.

8. A rod holder as set forth in claim 1, further comprising:
rubber blocks fixedly secured upon interior support surface of each one of said pair of clamping members for resiliently supporting said rod member within said rod holder.

9. A rod holder as set forth in claim 8, wherein:
said rubber blocks comprise concave portions for accommodating outer peripheral surface portions of said rod member.

10. A rod holder as set forth in claim 1, further comprising:
auxiliary means fixedly mounted upon said second end portion of said first one of said pair of clamping members from mounting a second rod member upon said rod holder.

11. A rod holder as set forth in claim 10, wherein:
said auxiliary means for mounting a second rod member upon said rod holder comprises a plurality of flexible wing members for engaging said second rod member so as to retain said second rod member within said auxiliary means.

12. A rod holder as set forth in claim 11, wherein:
said plurality of flexible wing members comprises three pairs of flexible wing members with said flexible wing members of each one of said pairs of flexible wing members extending toward each other from opposite side walls of said auxiliary means.

13. A rod holder as set forth in claim 9, wherein:
each one of said rubber blocks comprises three concave portions for accommodating outer peripheral surface portions of three rod members.

* * * * *